United States Patent
Burns et al.

(10) Patent No.: US 11,676,327 B2
(45) Date of Patent: Jun. 13, 2023

(54) TEMPORAL SPLIT TECHNIQUES FOR MOTION BLUR AND RAY INTERSECTION

(71) Applicant: Apple Inc., Cupertino, CA (US)

(72) Inventors: Christopher A. Burns, Austin, TX (US); Ali Rabbani Rankouhi, Bushey (GB); Justin A. Hensley, Mountain View, CA (US); Richard W. Schreyer, Scotts Valley, CA (US)

(73) Assignee: Apple Inc., Cupertino, CA (US)

( * ) Notice: Subject to any disclaimer, the term of this patent is extended or adjusted under 35 U.S.C. 154(b) by 29 days.

(21) Appl. No.: 17/205,680

(22) Filed: Mar. 18, 2021

(65) Prior Publication Data

US 2022/0301254 A1  Sep. 22, 2022

(51) Int. Cl.
  *G06T 15/06*  (2011.01)
  *G06F 16/901*  (2019.01)
  *G06T 15/00*  (2011.01)

(52) U.S. Cl.
  CPC .......... *G06T 15/06* (2013.01); *G06F 16/9027* (2019.01); *G06T 15/005* (2013.01)

(58) Field of Classification Search
  None
  See application file for complete search history.

(56) References Cited

U.S. PATENT DOCUMENTS

| | | | |
|---|---|---|---|
| 9,430,863 | B1 | 8/2016 | Grunschloss et al. |
| 2010/0289799 | A1 | 11/2010 | Hanika et al. |
| 2018/0286103 | A1* | 10/2018 | Woop ..................... G06T 15/06 |
| 2020/0160583 | A1 | 5/2020 | Woop et al. |
| 2020/0211263 | A1* | 7/2020 | Janus ....................... G06T 1/60 |
| 2020/0320776 | A1* | 10/2020 | Doyle ..................... G06T 15/06 |
| 2021/0035349 | A1 | 2/2021 | Vaidyanathan et al. |
| 2021/0287417 | A1* | 9/2021 | Afra ....................... G06T 5/002 |

(Continued)

OTHER PUBLICATIONS

Woop et al., "STBVH: A Spatial-Temporal BVH for Efficient Multi-Segment Motion Blur," Proceedings of HPG '17, Jul. 28-30, 2017, Article No. 8; https://doi.org/10.1145/3105762.3105779; pp. 1-8.

(Continued)

*Primary Examiner* — Andrew G Yang
(74) *Attorney, Agent, or Firm* — Kowert, Hood, Munyon, Rankin & Goetzel, P.C.; Michael B. Davis

(57) ABSTRACT

Techniques are disclosed relating to ray intersection in the context of motion blur. In some embodiments, a graphics processor includes time-oblivious ray intersect circuitry configured to receive coordinates for a ray and traverse a bounding volume hierarchy (BVH) data structure based on the coordinates to determine whether the ray intersects with one or more bounding regions of a graphics space. In some embodiments, in response to reaching a temporal branch element of the BVH data structure, the ray intersect circuitry initiates a shader program that determines a sub-tree of the BVH data structure for further traversal by the ray intersection circuitry, where the sub-tree corresponds to a portion of a motion-blur interval in which the ray falls. This may provide accurate ray tracing for motion blur while reducing area and power consumption of intersect circuitry, relative to time-aware implementations.

20 Claims, 16 Drawing Sheets

(56) References Cited

U.S. PATENT DOCUMENTS

2021/0390760 A1* 12/2021 Muthler .............. G06F 9/5027
2022/0198739 A1* 6/2022 Saleh .................. G06T 15/06

OTHER PUBLICATIONS

International Search Report and Written Opinion in PCT Appl. No. PCT/US2022/020699 dated Jul. 12, 2022, 15 pages.

Won-Jong Lee et al., "Flexible Ray Traversal with an Extended Programming Model," SA '19 Technical Briefs, Nov. 17, 2019, pp. 17-20.

Leonhard Grunschloss et al., "MSBVH: An Efficient Acceleration Data Structure for Ray Traced Motion Blur," High Performance Graphics, ACM, Aug. 5, 2011, pp. 65-70.

Shkurko Konstantin et al., "Time Interval Ray Tracing for Motion Blur," IEEE Transactions on Visualization and Computer Graphics, vol. 24, No. 12, Dec. 1, 2018, pp. 3225-3238.

Office Action in Taiwanese Appl. No. 111110038 dated Oct. 11, 2022, 5 pages.

* cited by examiner

*Example overlapping bounding regions for different sub-intervals*

Example pair of bounds for temporal branch node for interval [a,b]

TEMPORAL SPLIT TECHNIQUES FOR MOTION BLUR AND RAY INTERSECTION

BACKGROUND

Technical Field

This disclosure relates generally to graphics processors and more particularly to temporal split techniques for motion blur and ray tracing.

Description of the Related Art

Motion blur is a phenomenon that occurs when the image being recorded changes during recording of a single exposure. For example, a photograph of a moving freight train with a sufficiently long exposure time may show the train blurred while non-moving objects are non-blurred. In the computer graphics context, a graphics processor may simulate the motion blur effect for a frame of graphics data. In this context, a graphics primitive (e.g., a triangle) may have multiple different positions during an open shutter interval of a virtual camera (also referred to herein as a motion blur interval), and thus may affect pixel values at the multiple positions in the frame to cause a blurring effect.

Ray tracing is a rendering technique for generating an image by tracing the path of light as pixels in an image plane and simulating the effects of its encounters with virtual objects. Graphics processors that support ray tracing may utilize various types of acceleration data structures (ADSs) to efficiently determine which primitives are intersected by which rays in a graphics scene.

Each ray is typically assigned a time stamp, e.g., within a motion blur interval. When implementing both ray tracing and motion blur (where primitives can have different positions at different times during the interval), testing for ray/primitive intersection may be expensive in terms of processor resources and power consumption.

DETAILED DESCRIPTION

The following disclosure first provides an overview of ray tracing and motion blur techniques. This is followed by example techniques for traversing, for ray intersection tests, an acceleration data structure that includes temporal branch nodes. In some embodiments, time-oblivious ray intersect circuitry traverses an acceleration data structure until reaching a temporal branch node and then invokes a shader to handle the temporal node (e.g., to be executed by a shader core). The shader selects the next node for further traversal, based on a ray's timestamp. This may advantageously reduce complexity in ray intersect circuitry while properly handling motion blur.

Figure 1A:
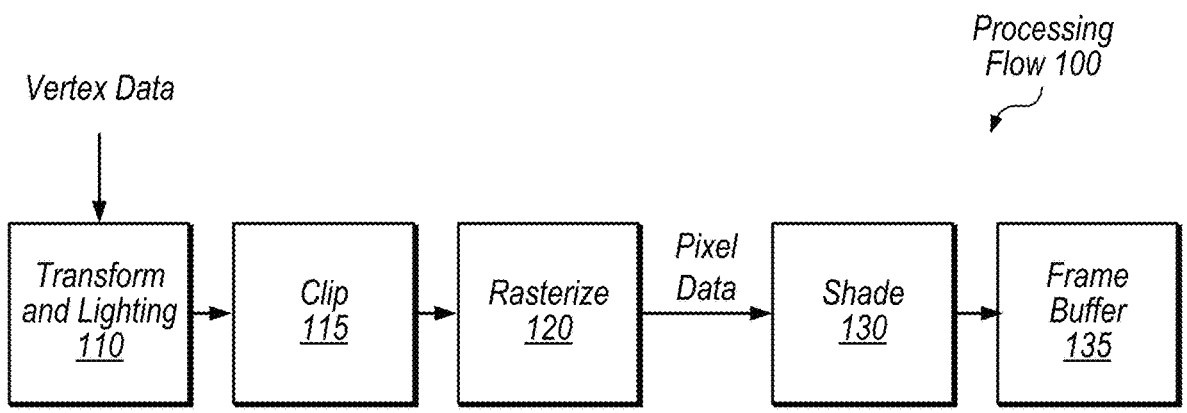
FIG. 1A is a diagram illustrating an overview of example graphics processing operations, according to some embodiments.
Figure 1B:
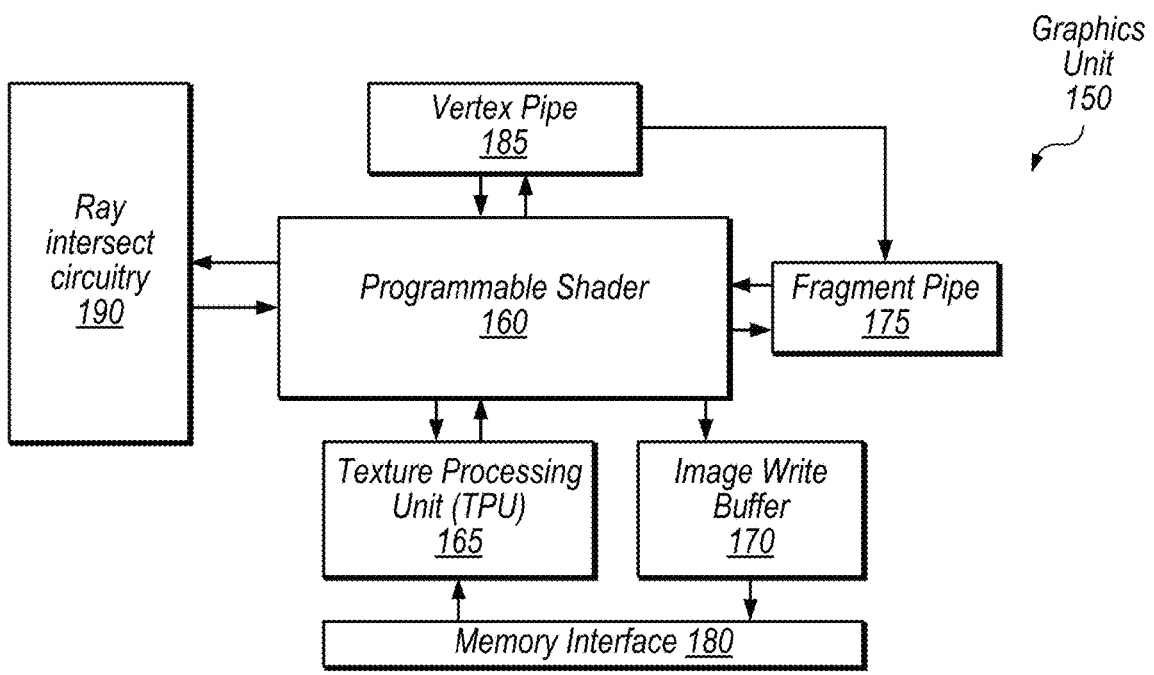
FIG. 1B is a block diagram illustrating an example graphics unit, according to some embodiments.
Figure 10:
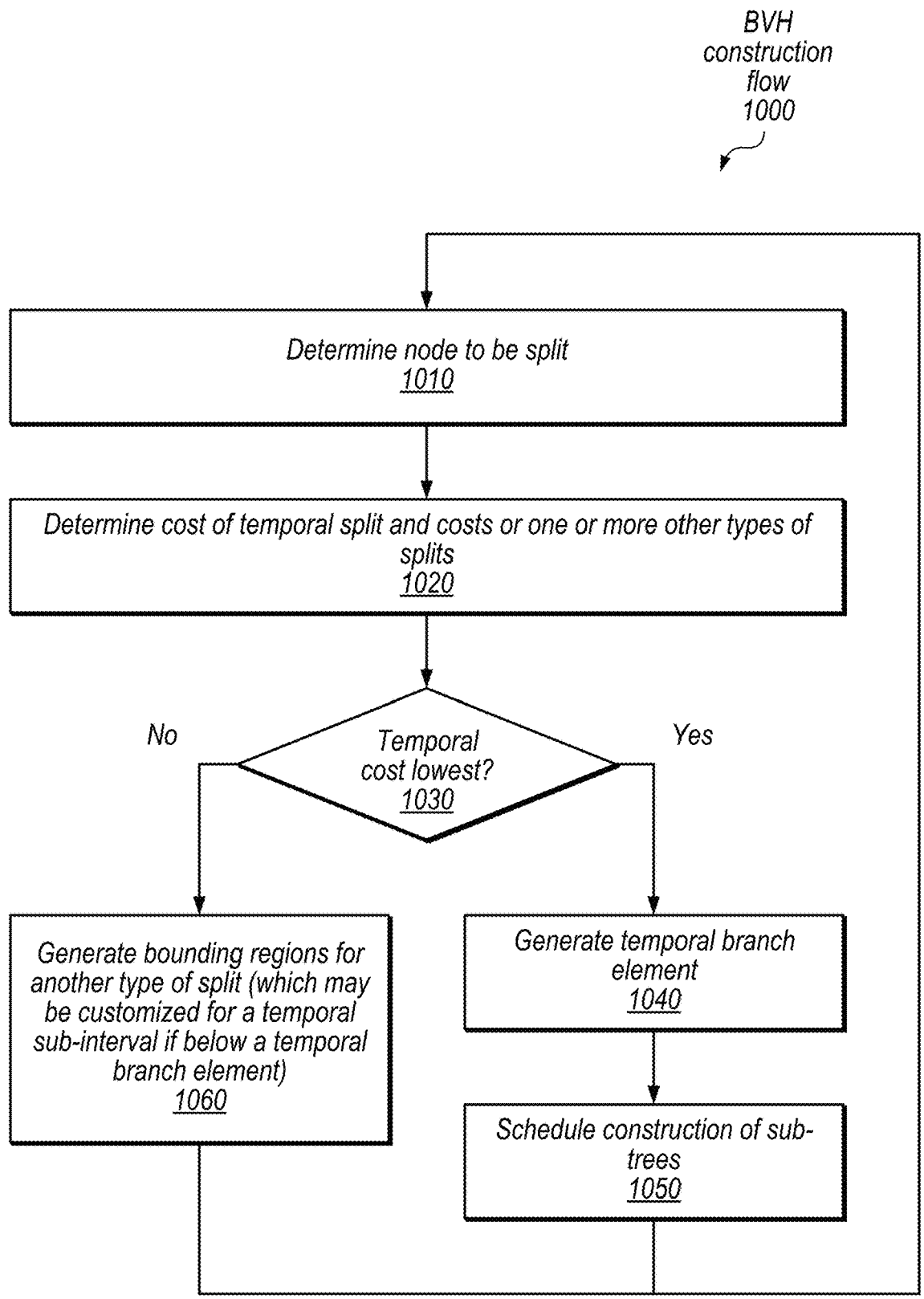
FIG. 10 is a flow diagram illustrating an example method for constructing a bounding volume hierarchy that includes temporal branch elements, according to some embodiments.
Figure 11:
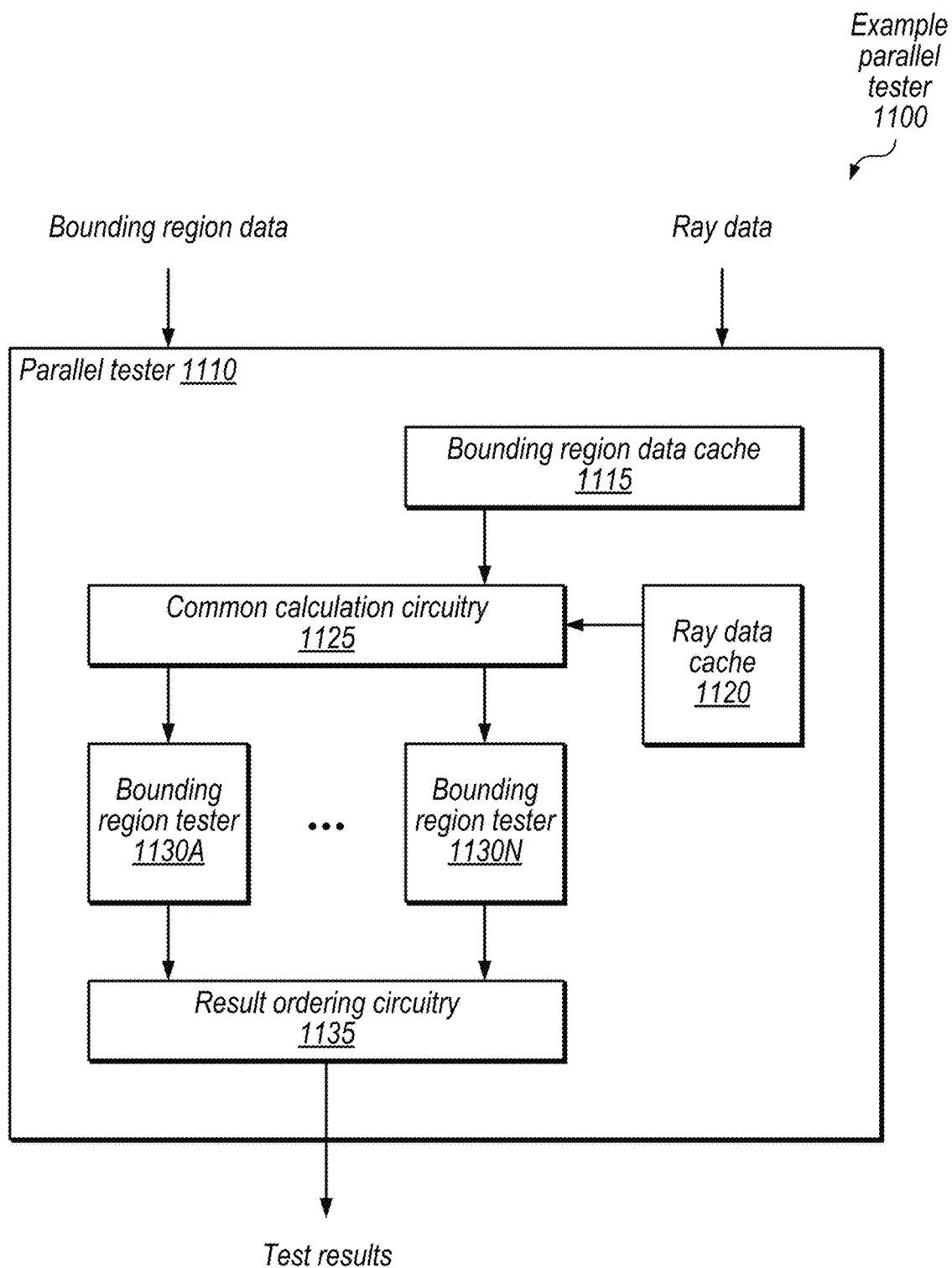
FIG. 11 is a block diagram illustrating an example parallel tester included in ray intersect circuitry, according to some embodiments.
Figure 12:
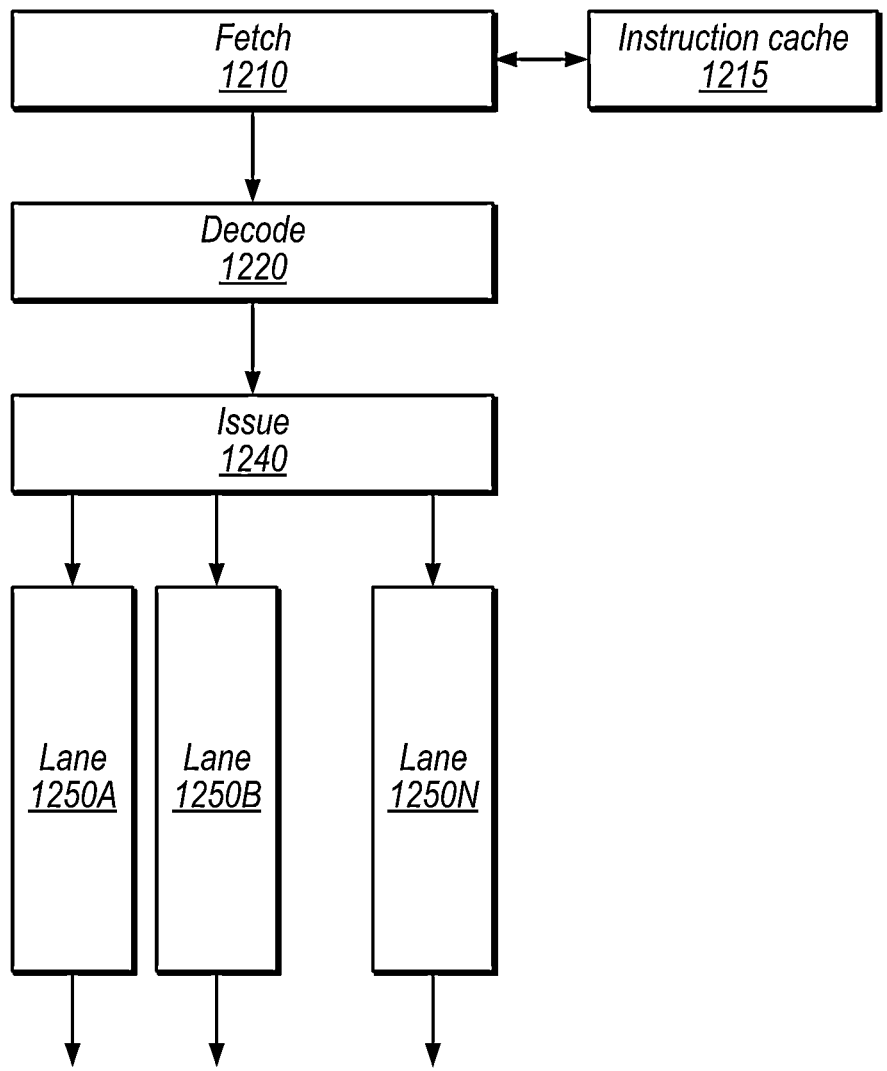
FIG. 12 is a block diagram illustrating an example shader pipeline for a single-instruction multiple-data (SIMD) group, according to some embodiments.

FIGS. 1A-1B provide an overview of graphics processing. Example traversal techniques and data structures are discussed with reference to FIGS. 2A-7 and 9. FIGS. 8A-8B show an example technique for a screening test performed by the shader program. FIG. 10 shows a technique for generating a data structure with temporal splits. FIGS. 11 and 12 provide examples of ray intersect circuitry and a shader pipeline configured to execute shader instructions. The remaining figures show an example method, computer system, computer applications, and computer-readable medium that stores circuit design information.

Graphics Processing Overview

Referring to FIG. 1A, a flow diagram illustrating an example processing flow 100 for processing graphics data is shown. In some embodiments, transform and lighting procedure 110 may involve processing lighting information for vertices received from an application based on defined light source locations, reflectance, etc., assembling the vertices into polygons (e.g., triangles), and transforming the polygons to the correct size and orientation based on position in a three-dimensional space. Clip procedure 115 may involve discarding polygons or vertices that fall outside of a viewable area. Rasterize procedure 120 may involve defining fragments within each polygon and assigning initial color values for each fragment, e.g., based on texture coordinates of the vertices of the polygon. Fragments may specify attributes for pixels which they overlap, but the actual pixel attributes may be determined based on combining multiple fragments (e.g., in a frame buffer), ignoring one or more fragments (e.g., if they are covered by other objects), or both. Shade procedure 130 may involve altering pixel components based on lighting, shadows, bump mapping, translucency, etc. Shaded pixels may be assembled in a frame buffer 135. Modern GPUs typically include programmable shaders that allow customization of shading and other processing procedures by application developers. Thus, in various embodiments, the example elements of FIG. 1A may be performed in various orders, performed in parallel, or omitted. Additional processing procedures may also be implemented.

Referring now to FIG. 1B, a simplified block diagram illustrating a graphics unit 150 is shown, according to some embodiments. In the illustrated embodiment, graphics unit 150 includes programmable shader 160, vertex pipe 185, fragment pipe 175, texture processing unit (TPU) 165, image write unit 170, and memory interface 180. In some embodiments, graphics unit 150 is configured to process both vertex and fragment data using programmable shader 160, which may be configured to process graphics data in parallel using multiple execution pipelines or instances.

Vertex pipe 185, in the illustrated embodiment, may include various fixed-function hardware configured to process vertex data. Vertex pipe 185 may be configured to communicate with programmable shader 160 in order to coordinate vertex processing. In the illustrated embodiment, vertex pipe 185 is configured to send processed data to fragment pipe 175 or programmable shader 160 for further processing.

Fragment pipe 175, in the illustrated embodiment, may include various fixed-function hardware configured to process pixel data. Fragment pipe 175 may be configured to communicate with programmable shader 160 in order to coordinate fragment processing. Fragment pipe 175 may be configured to perform rasterization on polygons from vertex pipe 185 or programmable shader 160 to generate fragment data. Vertex pipe 185 and fragment pipe 175 may be coupled to memory interface 180 (coupling not shown) in order to access graphics data.

Programmable shader 160, in the illustrated embodiment, is configured to receive vertex data from vertex pipe 185 and fragment data from fragment pipe 175 and TPU 165. Programmable shader 160 may be configured to perform vertex processing tasks on vertex data which may include various transformations and adjustments of vertex data. Programmable shader 160, in the illustrated embodiment, is also configured to perform fragment processing tasks on pixel data such as texturing and shading, for example. Programmable shader 160 may include multiple sets of multiple execution pipelines for processing data in parallel.

TPU 165, in the illustrated embodiment, is configured to schedule fragment processing tasks from programmable shader 160. In some embodiments, TPU 165 is configured to pre-fetch texture data and assign initial colors to fragments for further processing by programmable shader 160 (e.g., via memory interface 180). TPU 165 may be configured to provide fragment components in normalized integer formats or floating-point formats, for example. In some embodiments, TPU 165 is configured to provide fragments in groups of four (a "fragment quad") in a 2×2 format to be processed by a group of four execution pipelines in programmable shader 160.

Image write unit (IWU) 170, in some embodiments, is configured to store processed tiles of an image and may perform operations to a rendered image before it is transferred for display or to memory for storage. In some embodiments, graphics unit 150 is configured to perform tile-based deferred rendering (TBDR). In tile-based rendering, different portions of the screen space (e.g., squares or rectangles of pixels) may be processed separately. Memory interface 180 may facilitate communications with one or more of various memory hierarchies in various embodiments.

Overview of Ray Tracing and Motion Blur

As briefly discussed in the background section above, ray tracing techniques typically sample paths of light through the scene in the reverse direction of light propagation, starting from the camera and propagating into the scene, rather than from the light sources (this is sometimes referred to as "backward ray tracing"). A ray may be defined using an origin (O), a direction (D), and a parametric interval (T) defining the active portion of the ray. Thus, a ray may be thought of as a line segment. A graphics processor may perform various queries for a given ray. For example, a "closest hit" query may locate the nearest intersected geometry along a ray and within the parametric interval (this may be the most common type of query). An "any hit" query may locate any intersected geometry along the ray and within the parametric interval. This type of query may be used for shadow rays, for example, to determine whether a point in the scene has visibility to the light or is occluded. Once intersected geometry has been determined, that geometry may be shaded based on the intersections, and may in turn generate more rays for intersection testing, e.g., from reflective surfaces.

Ray intersection calculations are often facilitated by acceleration data structures (ADS). To efficiently implement ray intersection queries, a spatial data structure may reduce the number of ray-surface intersection tests and thereby accelerate the query process. A common class of ADS is the bounding volume hierarchy (BVH) in which surface primitives are enclosed in a hierarchy of geometric proxy volumes (e.g., boxes) that are cheaper to test for intersection. These volumes may be referred to as bounding regions. By traversing the data structure and performing proxy intersection tests along the way, the graphics processor locates a conservative set of candidate intersection primitives for a given ray. A common form of BVH uses 3D Axis-Aligned Bounding Boxes (AABB). Once constructed, an AABB BVH may be used for all ray queries, and is a viewpoint-independent structure. In some embodiments, these structures are constructed once for each distinct mesh in a scene, in the local object space or model space of that object, and rays are transformed from world-space into the local space before traversing the BVH. This may allow geometric instancing of a single mesh with many rigid transforms and material properties (analogous to instancing in rasterization). Animated geometry typically requires the data structure to be rebuilt (sometimes with a less expensive update operation known as a "refit"). For non-real-time use cases, in which millions or billions of rays are traced against a single scene in a single frame, the cost of ADS construction is fully amortized to the point of being "free." In a real-time context, however, there is typically a delicate trade-off between build costs and traversal costs, with more efficient structures typically being more costly to build.

In the motion blur context, rays may be assigned a time stamp within a motion blur time interval for a frame of graphics data. Primitives may have different positions at different times within this interval. It may be difficult to construct an ADS with bounding boxes that tightly fit primitives that move during the motion blur interval. Without tight bounding regions, many primitive tests may be performed that do not result in a hit, which may waste processing resources.

Figure 2A:
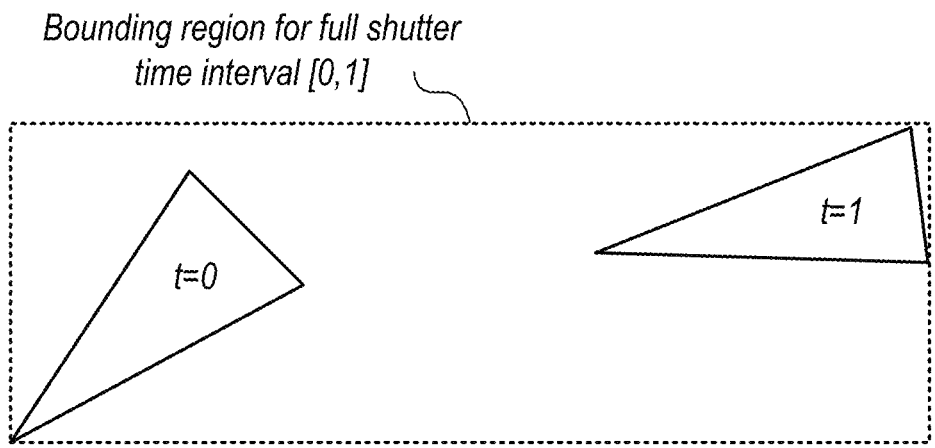
FIGS. 2A and 2B illustrate example bounding regions for a moving primitive for a full shutter interval and for a portion of the interval, according to some embodiments.

FIG. 2A is a diagram illustrating an example bounding region for a primitive for a full motion blur interval. The illustrated diagram is a two-dimensional representation to simplify explanation, but various disclosed techniques may be extended to three-dimensional implementations without loss of generality. In the illustrated example, a triangular primitive has a first position at time t=0 and a second, different position at time t=1. In some embodiments, primitive motion may be defined in a linear fashion, such that a moving triangle within a motion blur interval may be defined with six vertices that define the beginning and ending triangle positions. Note, however, that various disclosed techniques may be applied to more complex movement representations (e.g., non-linear directions of movement, non-linear speed, etc.). Linear motion blur techniques are discussed for purposes of explanation, but are not intended to limit the scope of the present disclosure.

For the triangle with illustrated starting and ending positions for a shutter time interval [0,1], the illustrated bounding region for the primitive for the entire interval is quite large relative to the size of the primitive. As a background for example ray intersection techniques, U.S. patent application Ser. No. 17/103,433, filed Nov. 24, 2020 is incorporated by reference herein in its entirety. The '433 application discusses ray intersection circuitry configured to traverse a BVH tree for a ray and launch a shader program upon reaching a leaf node, to perform an intersection test against one or more primitives. If the bounding region were a leaf in a BVH tree traversed by the circuitry of the '433 application, many intersection tests would generate non-hit results due to the large size of the bounding region. In some embodiments, disclosed temporal split techniques facilitate tighter bounding regions while allowing ray intersection circuitry to remain temporally oblivious, such that it does not receive or process time information for a given frame. This may reduce the area and power consumption of dedicated ray intersection circuitry while providing good ray tracing and motion blur performance, in some implementations. In other embodiments, certain disclosed techniques may be used with temporally-aware ray intersection circuitry.

Example Techniques Using Temporal Branch Elements

Figure 2B:
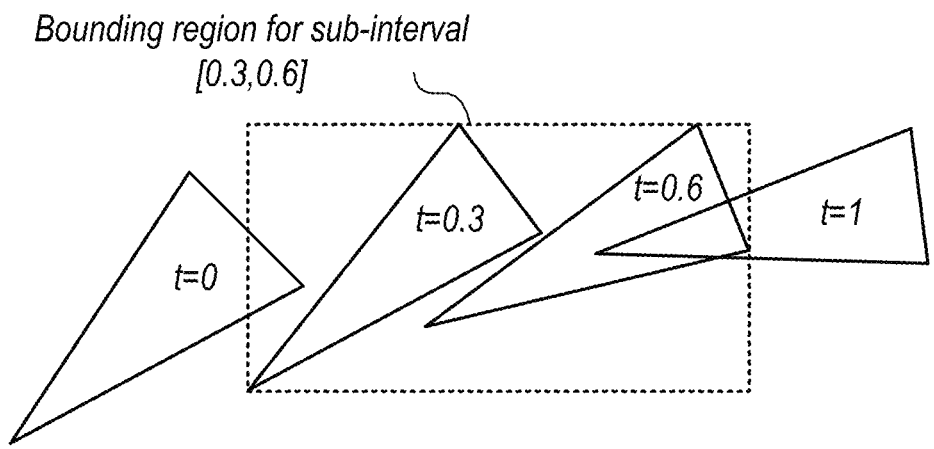

FIG. 2B is a diagram illustrating additional triangle positions and a bounding region for a sub-interval, according to some embodiments. Relative to FIG. 2A, FIG. 2B shows two additional triangle positions for t=0.3 and t=0.6. As shown, a bounding region for the sub-interval [0.3,0.6] provides a tighter fit for a moving primitive than a region for the full motion blur interval. Therefore, in some embodiments, an acceleration data structure includes temporal split elements, e.g., to define sub-trees corresponding to different portions of the motion blur interval.

Figure 3:
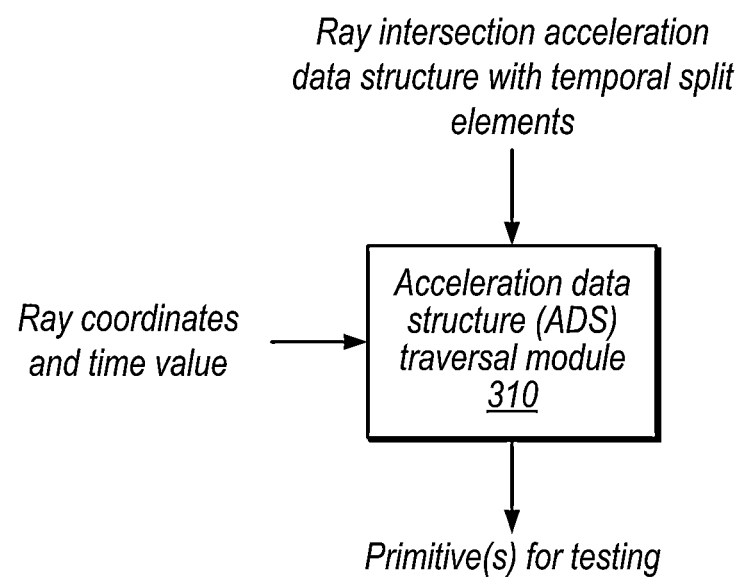
FIG. 3 is a block diagram illustrating an example acceleration data structure traversal module that processes a data structure with temporal split elements, according to some embodiments.

FIG. 3 is a block diagram illustrating an example ADS traversal module 310, according to some embodiments. As discussed in detail below, this module may be implemented with dedicated circuitry, program instructions executed by a processor (e.g., shader programs), or both. In the illustrated embodiment, ADS traversal module 310 receives a ray intersection ADS with temporal split elements and also receives ray coordinates and a time value for a ray. The ADS traversal module 310 is configured to generate one or more primitives for intersection testing based on traversal of the ADS (e.g., a BVH).

As used herein, a "module" refers to software or hardware that is operable to perform a specified set of operations. A module may refer to a set of software instructions that are executable by a computer system to perform the set of operations. A module may also refer to hardware that is configured to perform the set of operations. A hardware module may constitute general-purpose hardware as well as a non-transitory computer-readable medium that stores program instructions, or specialized hardware such as a customized ASIC. Accordingly, a module that is described as being "executable" to perform operations refers to a software module, while a module that is described as being "configured" to perform operations refers to a hardware module. A module that is described as "operable" to perform operations refers to a software module, a hardware module, or some combination thereof. Further, for any discussion herein that refers to a module that is "executable" to perform certain operations, it is to be understood that those operations may be implemented, in other embodiments, by a hardware module "configured" to perform the operations, and vice versa.

Figure 4:
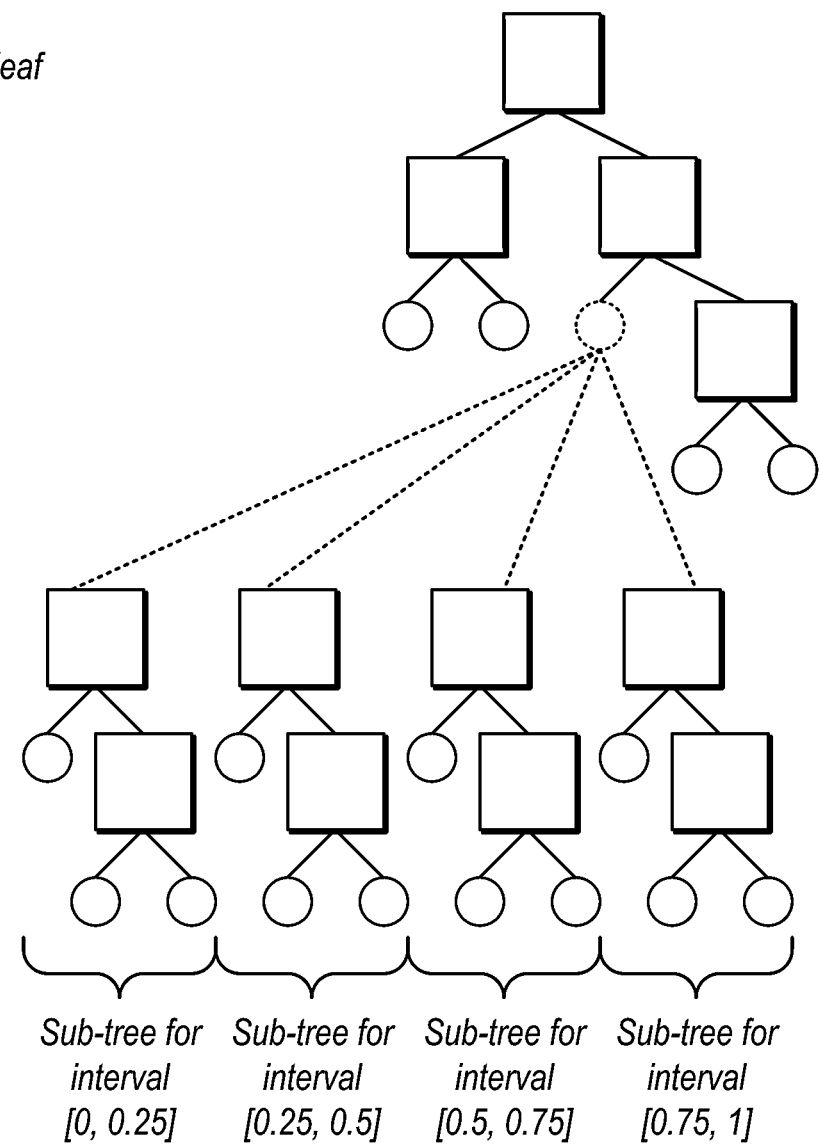
FIG. 4 is a diagram illustrating an example bounding volume hierarchy tree with temporal branch elements, according to some embodiments.

FIG. 4 is a diagram illustrating an example BVH tree 400 with a temporal split element, according to some embodiments. As shown, boxes represent nodes in the BVH tree and circles represent leaf elements. In the illustrated example, the dotted circle represents a temporal split branch leaf, which is an example of a temporal split element. The nodes and primitive leaves may be formatted as set out in the '433 application, for example.

In the illustrated example, the temporal split element has four underlying sub-trees, which split the motion blur interval [0,1] into four sub-intervals [0,0.25], [0.25,0.5], [0.5, 0.75], and [0.75,1]. Note that in some embodiments the sub-intervals of a split may not cover the same amount of time. For example, one sub-tree might cover the interval [0,0.1] and another sub-tree cover [0.1,1]. As shown, each sub-tree may include a number of nodes and leaves. As discussed above with reference to FIG. 2B, the bounding regions within the sub-trees may provide a tighter fit within a sub-interval than could be provided for the entire interval.

Temporal split elements in the BVH tree may be indicated using various encodings, e.g., a single bit in header information for a leaf element. In some embodiments, ray intersect circuitry is time-oblivious and does not perform time-related operations for temporal split nodes, but invokes a shader to select the appropriate sub-tree. The time ranges for different sub-intervals may be encoded in fields of the temporal split element, which may also encode the location in memory of the corresponding sub-tree, e.g., using an offset or pointer. In some embodiments, the branching factor of temporal split nodes is independent from the branching factor of non-temporal-split nodes. For example, in an embodiment where each traditional node in the BVH may have up to N children, a temporal split element may have up to M child sub-trees, where M and N are different integer values. Further, the branching factor of temporal split elements may be configurable in software such that different temporal split elements in the same BVH have different branching factors.

Figure 5:
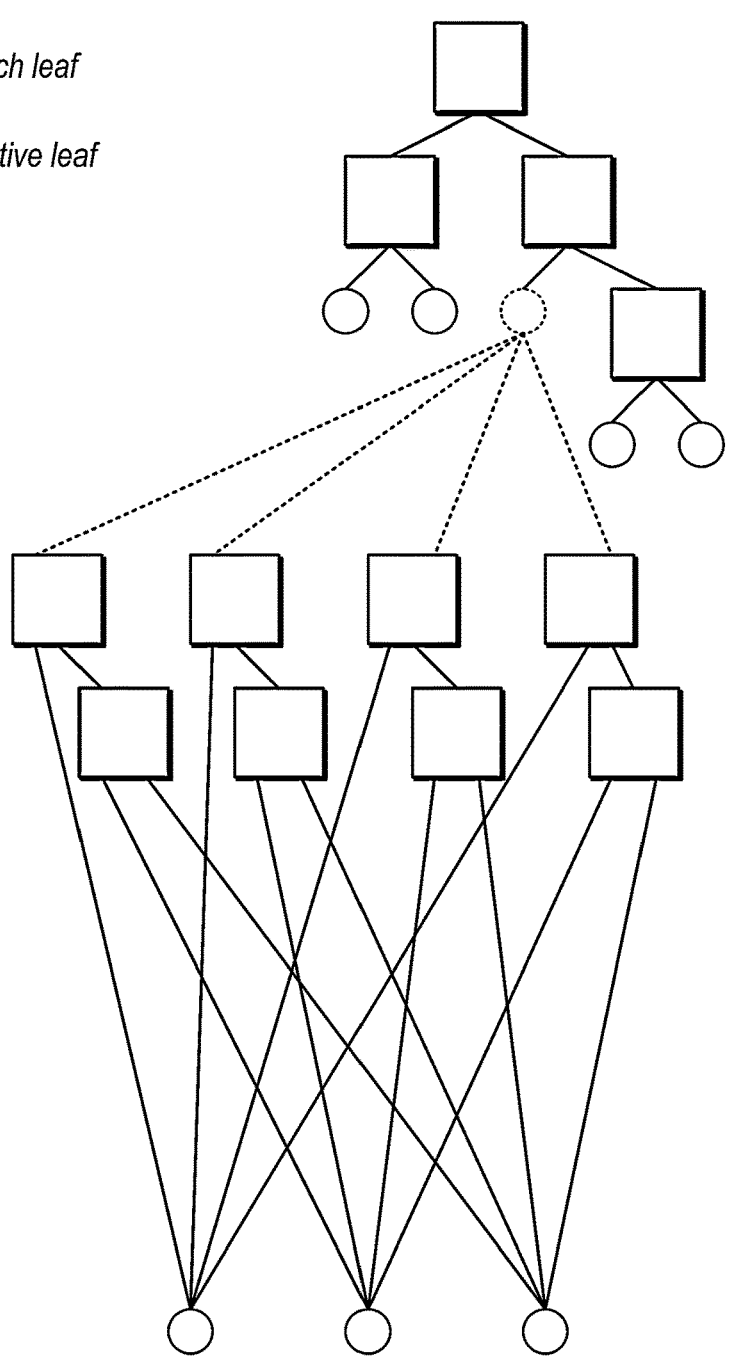
FIG. 5 is a diagram illustrating example aliasing of primitive data structures across different temporal sub-trees, according to some embodiments.

In some embodiments, the different sub-trees encode bounding regions (corresponding to their assigned different time intervals) for the same set of primitives. The primitive data (e.g., moving triangle data) may therefore be stored once and aliased across the sub-trees. This aliasing technique is illustrated in FIG. 5, in which the three primitive leaves of the sub-trees of BVH tree 500 are each instantiated once and then referenced by the different sub-trees.

Example Hardware with Time-Oblivious Ray Intersect Circuitry

Figure 6:
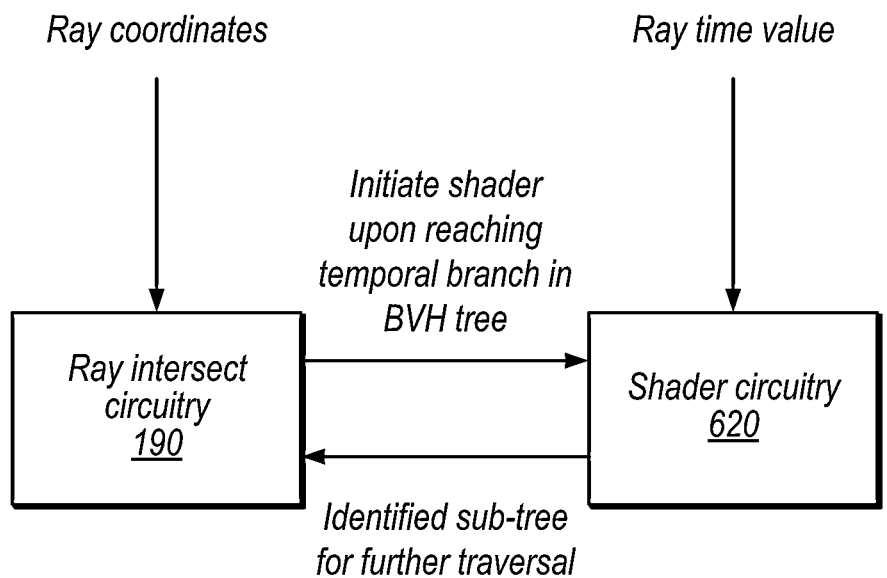
FIG. 6 is a block diagram illustrating example communications between ray intersect circuitry and shader circuitry, according to some embodiments.

FIG. 6 is a block diagram illustrating example interactions between ray intersect circuitry and shader circuitry, according to some embodiments. In the illustrated example, ray intersect circuitry 190 receives ray coordinates and traverses a BVH tree based on the ray coordinates. Upon reaching a temporal branch element in the BVH tree, the ray intersect circuitry 190 initiates a shader on shader circuitry 620. Shader circuitry 620 accesses a time value for the ray and executes the shader to determine an appropriate sub-tree for further traversal based on the time. For example, the shader may access information specifying the sub-intervals (which may be stored in the temporal branch element) and determine which sub-interval includes the ray time value. The shader circuitry 620 then identifies the sub-tree to the ray intersection circuitry 190 for further traversal.

In some embodiments, ray intersect circuitry 190 sends information to shader circuitry 620 identifying the temporal branch element (e.g., via a pointer or offset) so that the shader circuitry can determine the limits of the corresponding sub-intervals. In some embodiments, the information includes a signal specifying that sub-tree identification is requested, and shader circuitry 620 locates the appropriate shader program and launches a thread or a SIMD group to execute the shader program to select a sub-tree. Ray intersect circuitry may index into a shader table to indicate the shader program, for example, based on variables associated with the ray, leaf node, or both. Ray intersect circuitry 190 and shader circuitry 620 may utilize a shared buffer to access information needed to properly execute the shader program.

In some embodiments, ray intersect circuitry is configured to group rays that hit the same temporal branch into threads of the same SIMD group that executes a shader program to handle the temporal branch. Note that while the SIMD group may run the same program for these rays, rays processed by the SIMD group may take different paths based on their timestamp, for example. In some embodiments, rays that hit different temporal branches may also be assigned to the same SIMD group, e.g., if parameters used to select the target shader match for the grouped rays.

The term "SIMD group" is intended to be interpreted according to its well-understood meaning, which includes a set of threads for which processing hardware processes the same instruction in parallel using different input data for the different threads. Various types of computer processors may include sets of pipelines configured to execute SIMD instructions. For example, graphics processors often include programmable shader cores that are configured to execute instructions for a set of related threads in a SIMD fashion. Other examples of names often used for a SIMD group include: a wavefront, a clique, or a warp. A SIMD group may be a part of a larger thread group, which may be broken up into a number of SIMD groups based on the parallel processing capabilities of a computer (although note that SIMD groups launched to handle a temporal branch element may not be included in a larger threadgroup). In some embodiments, each thread is assigned to a hardware pipeline that fetches operands for that thread and performs the specified operations in parallel with other pipelines for the set of threads. Note that processors may have a large number of pipelines such that multiple separate SIMD groups may also execute in parallel. In some embodiments, each thread has private operand storage, e.g., in a register file. Thus, a read of a particular register from the register file may provide the version of the register for each thread in a SIMD group.

As used herein, the term "thread" includes its well-understood meaning in the art and refers to sequence of program instructions that can be scheduled for execution independently of other threads. Multiple threads may be included in a SIMD group to execute in lock-step. Multiple threads may be included in a task or process (which may correspond to a computer program). Threads of a given task may or may not share resources such as registers and memory. Thus, context switches may or may not be performed when switching between threads of the same task.

In various embodiments, the disclosed techniques may advantageously allow ray intersect circuitry 190 to remain time-oblivious, which may improve its performance and reduce its chip area and complexity, relative to dedicated intersect circuitry configured to perform time-based operations. Further, launching a shader may allow for additional screening tests, as discussed below with reference to FIGS. 8A-8B.

Figure 7A:
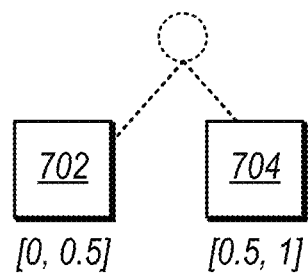
FIGS. 7A-7B are diagrams illustrating an example temporal branch element and overlapping bounding regions for a primitive for different sub-intervals, according to some embodiments.
Figure 7B:
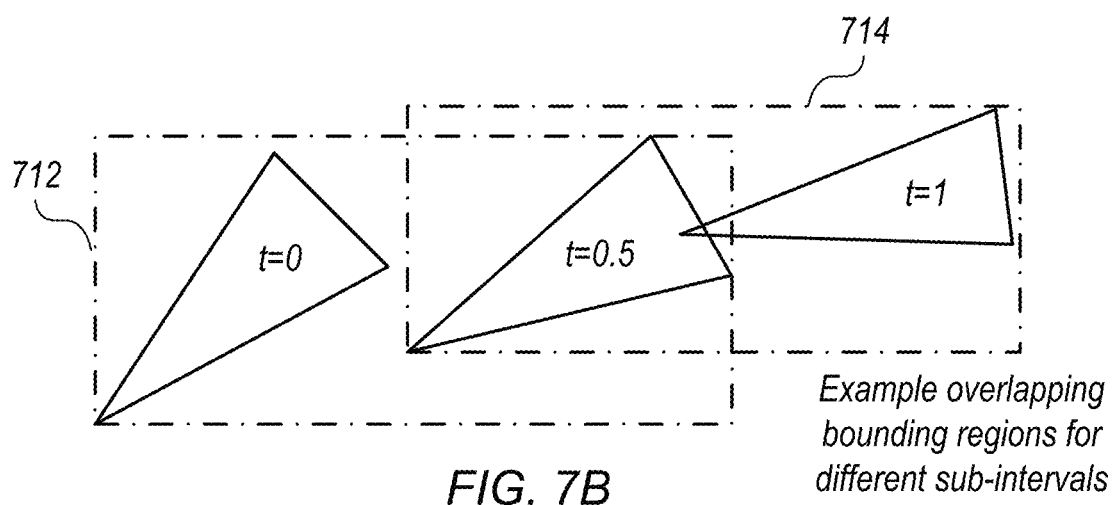
Figure 8A:
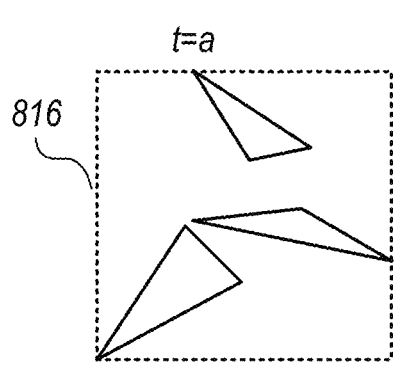
FIGS. 8A-8B are diagrams illustrating an example screening test performed by a shader for a temporal branch element, according to some embodiments.
Figure 8A:
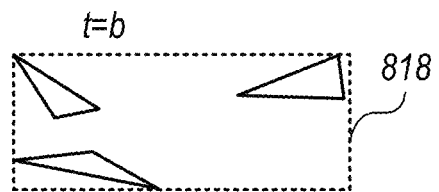
Figure 8B:
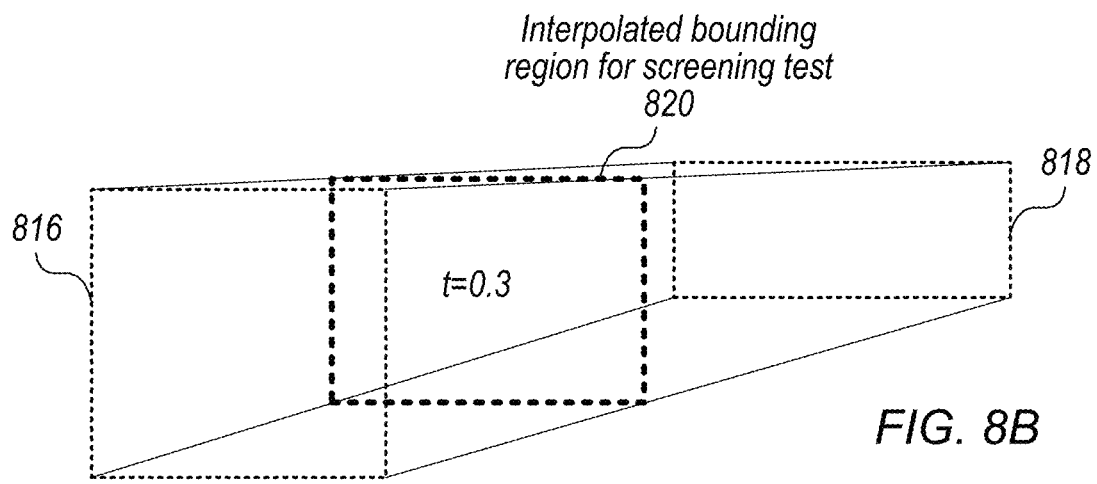

FIGS. 7A-7B illustrate the concept that bounding regions for different sub-intervals may overlap. FIG. 7A is a diagram illustrating an example temporal branch element with child nodes for two sub-trees, according to some embodiments. In this example, the interval [0,1] is evenly split into two sub-intervals [0,0.5] and [0.5,1]. FIG. 7B is a diagram illustrating bounding regions 712 and 714 for a primitive corresponding to the two different sub-intervals of FIG. 7A. FIG. 7B shows three example locations for the primitive at times t=0, t=0.5, and t=1. Based on these locations, the bounding regions for the different intervals overlap. As discussed above, FIGS. 7A-7B show a two-dimensional space for purposes of explanation, but the primitives and bounding regions are typically defined in three dimensional space.

FIGS. 8A-8B illustrate an example screening test performed by a shader program, according to some embodiments. In some embodiments, temporal branch elements of the BVH tree encode a pair of bounds for the beginning and ending times of a temporal interval. In the illustrated example of FIG. 8A, a sub-tree includes three primitives, which are enclosed by bounding region 816 at time t=a and enclosed by bounding region 818 at time t=b. These bounding regions may be encoded into the temporal split branch for times t=0 and t=1, for example, if the temporal branch is the first temporal branch in the tree or for a sub-interval thereof if there are previous temporal branches in the tree.

In some embodiments, shader circuitry 620 executes a shader program that interpolates between the pair of bounds for a temporal branch element. In the illustrated example, the shader linearly interpolates between the pair of bounds to generate a bounding region 820 for time t=0.3 (the timestamp of the ray in this example).

If the ray intersects this interpolated bounding region, shader circuitry 620 may indicate the corresponding sub-tree to the ray intersect circuitry 190 for further traversal. If the ray does not intersect the interpolated bounding region, shader circuitry 620 may end the traversal without descending further in the current region of the BVH tree (note that the shader circuitry 620 may indicate this outcome to the ray intersect circuitry 190, which may still need to traverse other regions of the BVH tree). In some embodiments, the disclosed screening techniques may advantageously reduce traversal operations by the ray intersect circuitry 190, which may improve overall performance and reduce power consumption. The screening techniques may have varying levels of effectiveness at different parts of the tree, depending on the range of motion of the primitives, the number of primitives in the subtree, etc. Therefore, the screening test may be performed for certain temporal branch element and not others in the same BVH tree, according to one or more heuristics implemented during the construction of the tree.

Figure 9:
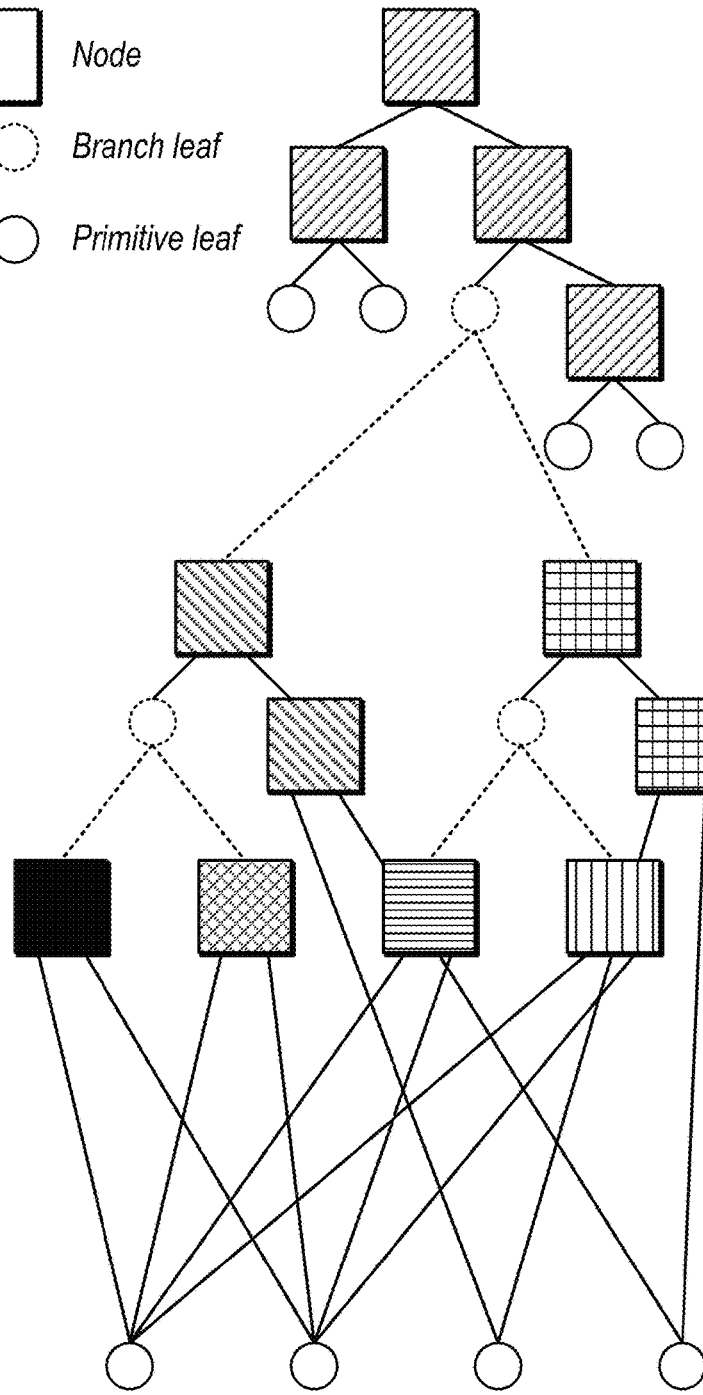
FIG. 9 is a diagram illustrating an example bounding volume hierarchy tree with multiple levels of temporal branch elements, according to some embodiments.

FIG. 9 is a diagram illustrating an example BVH tree with temporal branch elements at multiple levels, according to some embodiments. In the illustrated embodiment, there are branch leaves at two different levels in the BVH tree 900, which results in sub-trees for multiple different time intervals. In particular, the shading of FIG. 9 shows node elements in seven different sub-trees corresponding to different portions of the motion blur interval. Using multiple levels of temporal splits may further improve the tightness of bounding region fits, in some situations.

Example BVH Construction Techniques

FIG. 10 is a flow diagram illustrating an example method 1000 for generating a BVH tree with temporal splits, according to some embodiments. The method shown in FIG. 1010 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 1010, in the illustrated embodiment, the device determines a node to be split to generate the next level of the BVH tree. Initially, this may be the root node and may correspond to a bounding region that covers an entire scene space and the full motion blur interval. The device may be generating the BVH tree for the first time or updating the BVH based on changes in the scene.

At 1020, in the illustrated embodiment, the device determines the cost of a temporal split and costs of one or more other types of splits such as object splits or spatial splits. For example, the cost of a sub-tree referenced by a temporal split may be proportional to the triple product of the bounds' surface area, the number of primitives enclosed, and the duration of the time interval enclosed. Further, the cost may include an overhead estimate based on the cost of initiating a shader to handle a temporal node during traversal. The cost of partitioning may be the sum of the costs of the partitions. Therefore, the device may generate multiple candidate splits and compare the costs to determine whether the temporal split has the lowest cost.

At 1030, in the illustrated embodiment, if the temporal cost is lowest, then flow proceeds to 1040 and the device generates a temporal branch element to sub-divide the current temporal interval. The device then schedules construction of sub-trees of the temporal branch at 1050. If the cost of a different type of split is lower, flow proceeds to 1060 and the device generates bounding regions for the lowest cost non-temporal split. Note that if there are prior temporal branch elements in the tree, these bounding regions are customized for the sub-interval in which they reside. In either case, flow proceeds back to 1010 for processing of the next node, until construction of the tree is complete.

Example Ray Intersection Circuitry and Shader Pipeline

FIG. 11 is a block diagram illustrating detailed example parallel bounding region test circuitry, according to some embodiments. In the illustrated example, parallel tester circuitry 1110 receives ray data and bounding region data for multiple bounding regions and outputs results indicating whether a ray intersected the bounding regions. Parallel tester 1110 includes bounding region data cache 1115, ray data cache 1120, common calculation circuitry 1125, bounding region testers 1130A-1103N, and result ordering circuitry 1135.

In some embodiments, parallel tester 1110 is a node tester configured to test up to N bounding regions, where each non-temporal split node in the ADS includes up to N child nodes. Ray intersect circuitry 190 may include multiple parallel testers 1110, e.g., 2, 4, 8, etc. for each programmable shader, in embodiments with M programmable shader instances. In these embodiments, each node tester may test up to M nodes per clock, per programmable shader core. In some embodiments (e.g., for example depth-first traversals discussed herein), a given ray is tested against at most one node at a time.

Bounding region data cache 1115 and ray data cache 1120, in some embodiments, are configured to store node and ray data respectively for the current test and for potential re-use in subsequent tests. These caches may be able to sustain a throughput corresponding to a node test per clock per tester. For tests to occur, both ray and bounding region information may be needed, so cache entries may be locked for reading until both pieces of information are available. In some embodiments, grouping rays that target the same next node may improve performance of the caches and reduce bandwidth to a higher-level cache.

Common calculation circuitry 1125, in some embodiments, is configured to perform calculations that are common to all bounding regions currently being tested. This may include determining bounds represented using a compressed quantized format. As another example, this may include common ray calculations such as determining a reciprocal of the ray and a test point of the ray. In some embodiments, common calculations are performed at a higher floating-point precision that bounding region tests.

Bounding region testers 1130, in some embodiments, are configured to test whether a ray intersects a representation of a bounding region (note that false positives may be included in embodiments with quantization, however). For box-shaped bounding regions, these testers may implement a slab test (e.g., finding the distance of each ray to the six sides of each box and comparing those values to determine whether the ray has hit in the box or not). Generally, bounding region testers 1130 may include circuitry configured to perform arithmetic operations associated with the type of testing implemented and this circuitry may be pipelined. In some embodiments, bounding region testers 1130 utilized lower-precision floating point arithmetic and choose rounding modes such that the calculated intersection results for the three planes facing the ray round down (towards the ray) and the intersection results for the three opposite planes facing away round up (away from the ray) to ensure that the bounding region test is conservative and does not yield false negatives.

Result ordering circuitry 1135, in some embodiments, is configured to order hit results (e.g., based on their distance to the origin of the ray) and output the results for use in further traversal. Therefore, non-leaf children may be pushed onto a stack based on this ordering. In some embodiments, any leaf children may be grouped into a single stack entry. In some embodiments, the ordering may affect traversal of the ADS, e.g., child nodes corresponding to closer hits may be traversed first during a depth-first search.

In some embodiments, parallel tester circuitry 1110 is configured to save the value of the parametric interval (T) parameter at which a ray intersects a bounding region (and may save the value at a higher precision than the plane tests). This value may be referred to as T-local and may be saved in stack entries and retrieved for use as the numerical ray origin for child bounding region plane tests.

In some embodiments, multiple rays may be tested in parallel against the same node, a ray may be tested in parallel against multiple nodes, or both. For example, ray intersect circuitry 190 may include multiple parallel testers 1110 to process all or a portion of the rays in a group of rays in parallel. In some embodiments, each bounding region tester 1130 may be configured to test multiple rays against a bounding region in parallel.

As shown, the implementation of FIG. 11 may be time-oblivious. The illustrated circuitry is not configured to receive any time inputs associated with motion blur (e.g., the time value for the ray or time interval information for BVH sub-trees). Rather, in these embodiments, the shader program invoked upon reaching a temporal branch element is configured to steer the ray intersect circuitry to the next sub-tree.

FIG. 12 is a block diagram illustrating an example shader pipeline, according to some embodiments. In some embodiments, the illustrated pipeline is included in programmable shader 160, which may include multiple such pipelines configured to execute different SIMD groups in parallel. In some embodiments, multiple programmable shader units 160 are included in a GPU. In these embodiments, global control circuitry may assign work to the different sub-portions of the GPU which may in turn assign work to shader cores to be processed by shader pipelines.

In the illustrated embodiment, the pipeline includes fetch, decode, issue, and lane pipe stages. In the illustrated embodiment, instructions are fetched from instruction cache 1215 and operands are accessed in operand cache 1235.

Fetch stage 1210, in the illustrated embodiment, is configured to fetch instructions from instruction cache 1215, buffer fetched instructions, and provide them to the rest of the pipeline for execution. In pipelined execution, the illustrated pipeline includes sequential circuitry (e.g., latches or flip-flops) to store data generated by one stage for use by the next stage in the subsequent clock cycle. The concept of "execution" is broad and may refer to 1) processing of an instruction throughout an execution pipeline (e.g., through fetch, decode, execute, and retire stages) and 2) processing of an instruction at an execution unit or execution subsystem of such a pipeline (e.g., an integer execution unit or a load-store unit). The latter meaning may also be referred to as "performing" the instruction. Thus, "performing" an add instruction refers to adding two operands to produce a result, which may, in some embodiments, be accomplished by a circuit at an execute stage of a pipeline (e.g., an execution unit or ALU in a lane 1250). Conversely, "executing" the add instruction may refer to the entirety of operations that occur throughout the pipeline as a result of the add instruction. Similarly, "performing" a "load" instruction may include retrieving a value (e.g., from a cache, memory, or stored result of another instruction) and storing the retrieved value into a register or other location.

In response to instruction cache misses, instructions may be retrieved from a higher level cache of memory. Fetch stage 1210 may predict the direction and target of control transfer instructions (e.g., branches). In some embodiments, fetch stage 1210 may implement a number of data structures, such as an instruction translation lookaside buffer (ITLB), instruction buffers, and/or structures configured to store state that is relevant to thread selection and processing (in multi-threaded embodiments).

Decode stage 1220, in some embodiments, is configured to prepare fetched instructions for further processing. Decode stage 1220 may be configured to identify the particular nature of an instruction (e.g., as specified by its opcode) and to determine the source and destination registers encoded in an instruction, if any. In some embodiments, decode stage 1220 is configured to detect certain dependencies among instructions, convert certain complex instructions to two or more simpler instructions for execution, or both.

Register renaming may facilitate the elimination of certain dependencies between instructions (e.g., write-after-read or "false" dependencies), which may in turn prevent unnecessary serialization of instruction execution. In some embodiments, a map unit maintains a mapping table that reflects the relationship between architectural registers and the physical registers to which they are mapped. The map unit may also maintain a "free list" of available (i.e. currently unmapped) physical registers.

Once decoded and renamed, instructions may be ready to be scheduled for performance. In the illustrated embodiment, issue stage 1240 schedules instructions that are ready for performance and issues instruction sources and data to lanes 1250 for ready instructions.

Issue stage 1240 may be configured to provide instruction sources and data to the various execution units for picked instructions. Input operands may be sourced from register files, operand caches, forwarded results of previous instructions, etc. In operand cache embodiments, an operand load stage may wait for operand allocation in the operand cache before allowing instructions to proceed.

Instructions issued from issue stage 1240 may proceed to lanes 1250A-1250N to be performed. In some embodiments, each lane 1250 performs operations for a thread of a SIMD group. Each lane may include multiple different types of execution units, e.g., integer units, floating-point units, load/store units, etc. Each execution unit may utilize multiple pipeline stages.

In various embodiments, any of the units illustrated in FIG. 12 may be implemented as one or more pipeline stages, to form an instruction execution pipeline of a processing element that begins when thread occurs in fetch stage 1210 and ends with commitment of results of instruction execution. Depending on the manner in which the functionality of the various units of FIG. 12 is partitioned and implemented, different units may require different numbers of cycles to complete their portion of instruction processing. In some instances, certain units may require a variable number of cycles to complete certain types of operations.

As used herein the terms "complete" and "completion" in the context of an instruction refer to commitment of the instruction's result(s) to the architectural state of a processor or processing element. For example, completion of an add instruction includes writing the result of the add instruction to a destination register. Similarly, completion of a load instruction includes writing a value (e.g., a value retrieved from a cache or memory) to a destination register or a representation thereof.

The concept of a processor "pipeline" is well understood, and refers to the concept of splitting the "work" a processor performs on instructions into multiple stages. In some embodiments, instruction decode, dispatch, execution (i.e., performance), and retirement may be examples of different pipeline stages. Many different pipeline architectures are possible with varying orderings of elements/portions. Various pipeline stages perform such steps on an instruction during one or more processor clock cycles, then pass the instruction or operations associated with the instruction on to other stages for further processing.

Example Method

Figure 13:
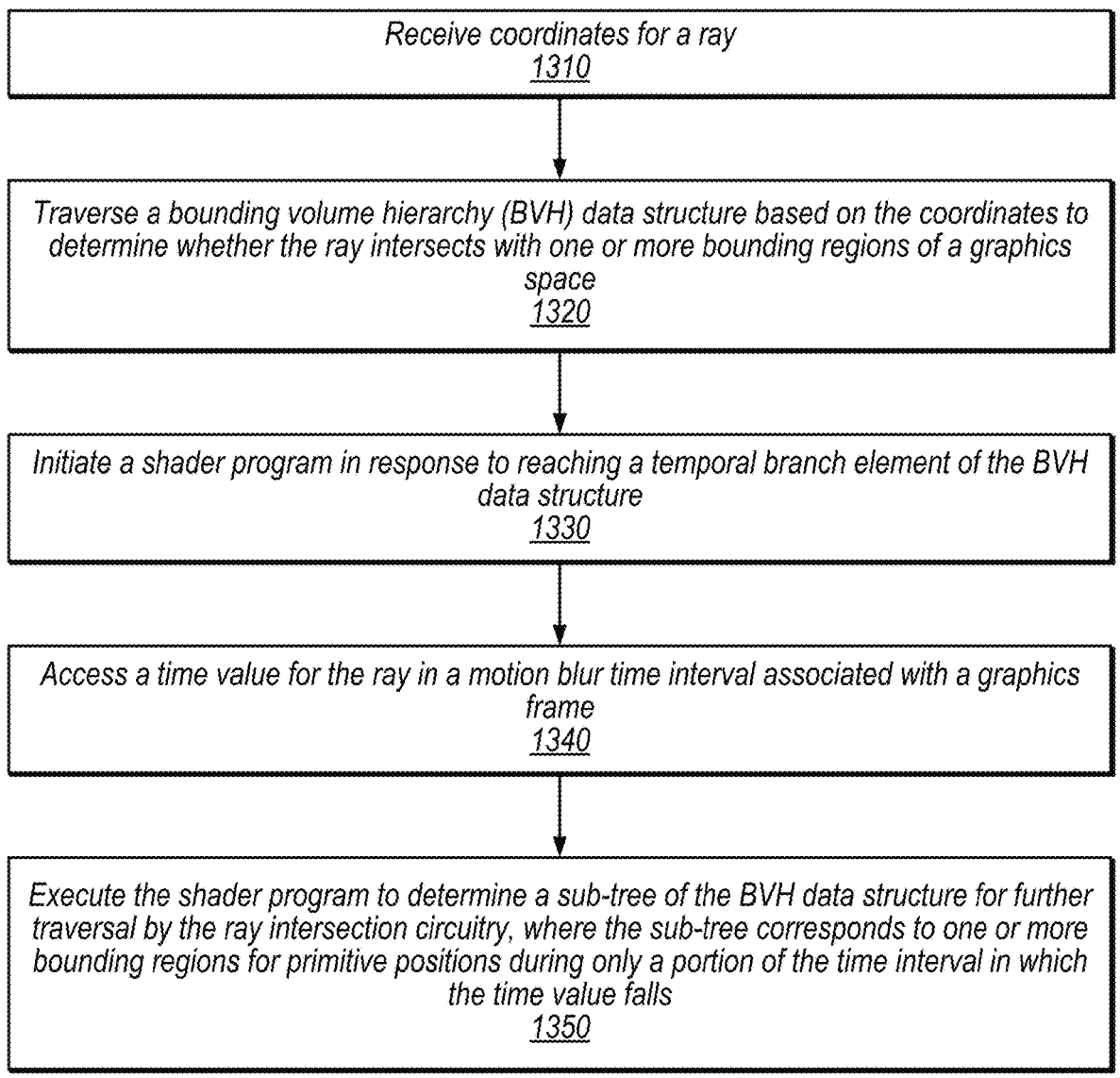
FIG. 13 is a flow diagram illustrating an example method, according to some embodiments.

FIG. 13 is a flow diagram illustrating an example method for ray intersection traversal in the context of motion blur, according to some embodiments. The method shown in FIG. 13 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 1310, in the illustrated embodiment, ray intersect circuitry receives coordinates for a ray. The coordinates may include an origin, a three-dimensional direction, and a parametric interval over which the ray is valid, for example.

At 1320, in the illustrated embodiment, the ray intersect circuitry traverses a bounding volume hierarchy (BVH) data structure based on the coordinates to determine whether the ray intersects with one or more bounding regions of a graphics space. This may include a depth-first search, for example, and determining whether the ray intersects with bounding regions at multiple levels of the BVH.

At 1330, in the illustrated embodiment, the ray intersect circuitry initiates a shader program in response to reaching a temporal branch element of the BVH data structure. This may include sending a signal to shader circuitry that includes control data (or indicates a location of control data) sufficient to launch a SIMD group. The ray intersect circuitry may indicate the shader program or may simply indicate that a temporal branch element mas been reached and the shader circuitry may select the appropriate shader program.

At 1340, in the illustrated embodiment, shader circuitry accesses a time value for the ray in a motion blur time interval associated with a graphics frame. This may be performed by dedicated circuitry or by executing instruction(s) of the shader program, for example. The time value may be stored in a data structure for the ray. The ray intersect circuitry may be time-oblivious and may not receive the time value as an input. Note that in other embodiments, ray intersect circuitry may be time-aware and may not launch a shader to access a time value and handle temporal splits. Further, in some embodiments the shader program may perform other operations in addition to, or in place of, accessing a time value in order to choose a sub-tree based on one or more criteria.

At 1350, in the illustrated embodiment, the shader circuitry executes the shader program to determine a sub-tree of the BVH data structure for further traversal by the ray intersection circuitry, wherein the sub-tree corresponds to one or more bounding regions for primitive positions during only a portion of the time interval in which the time value falls. This may include accessing a data structure for the temporal branch element to determine the sub-intervals corresponding to sub-trees of the branch. In some embodiments, the shader program is executable to provide an offset value to the determined sub-tree to the ray intersection circuitry.

In some embodiments, the BVH data structure has a first branching factor and the temporal split element has a second branching factor, determined by the shader program, that is different than the first branching factor. Thus, different temporal split elements in the BVH may have different branching factors, which may differ from the branching factor of non-temporal-branch nodes. In some embodiments, when building the BVH, the device may determine the cost of multiple different branching factors for a given temporal split branch and select the most cost-effective branching factor.

In some embodiments, the shader program includes a screening test that determines a first bounding region corresponding to a beginning of a time interval associated with the temporal branch element and a second bounding region corresponding to an end of the time interval. As discussed above with reference to FIGS. 8A-8B, the shader program may interpolate between the first and second bounding regions, based on the time value, to determine an interpolated bounding region and determine whether to initiate further traversal based on whether the ray intersects the interpolated bounding region (e.g., the device may not traverse any subtrees of the temporal branch element if the ray does not intersect the interpolated bounding region). In some embodiments, the first and second bounding regions are stored in a data structure for the temporal branch element of the BVH data structure.

In some embodiments, the BVH data structure includes a primitive data structure representing at least beginning and end coordinates for a moving primitive, where multiple different sub-trees point to the primitive data structure (e.g., using a pointer or an offset value), where the multiple different sub-trees represent different portions of the motion blur time interval. This aliasing may reduce storage requirements for a temporal split BVH.

In some embodiments, the BVH data structure includes temporal branch elements at multiple levels (e.g., as shown in FIG. 9) such that a first temporal branch element at a first level defines a first sub-tree that is divided into multiple sub-trees by a second temporal branch element at a second level.

One the ray intersect circuitry reaches a leaf node of the BVH, it may initiate another shader program (e.g., launch a SIMD group to be executed by the shader circuitry) to determine whether the ray intersects one or more moving primitives.

In some embodiments, the shader circuitry is configured to execute a shader program to generate the BVH data structure, including to: begin at a root node corresponding to the full motion blur time interval; for multiple levels of the BVH data structure, when generating multiple child elements for a node at one level, determine whether to perform a temporal split or a non-temporal split; and insert one or more temporal branch elements for one or more determined temporal splits.

Example Device

Figure 14:
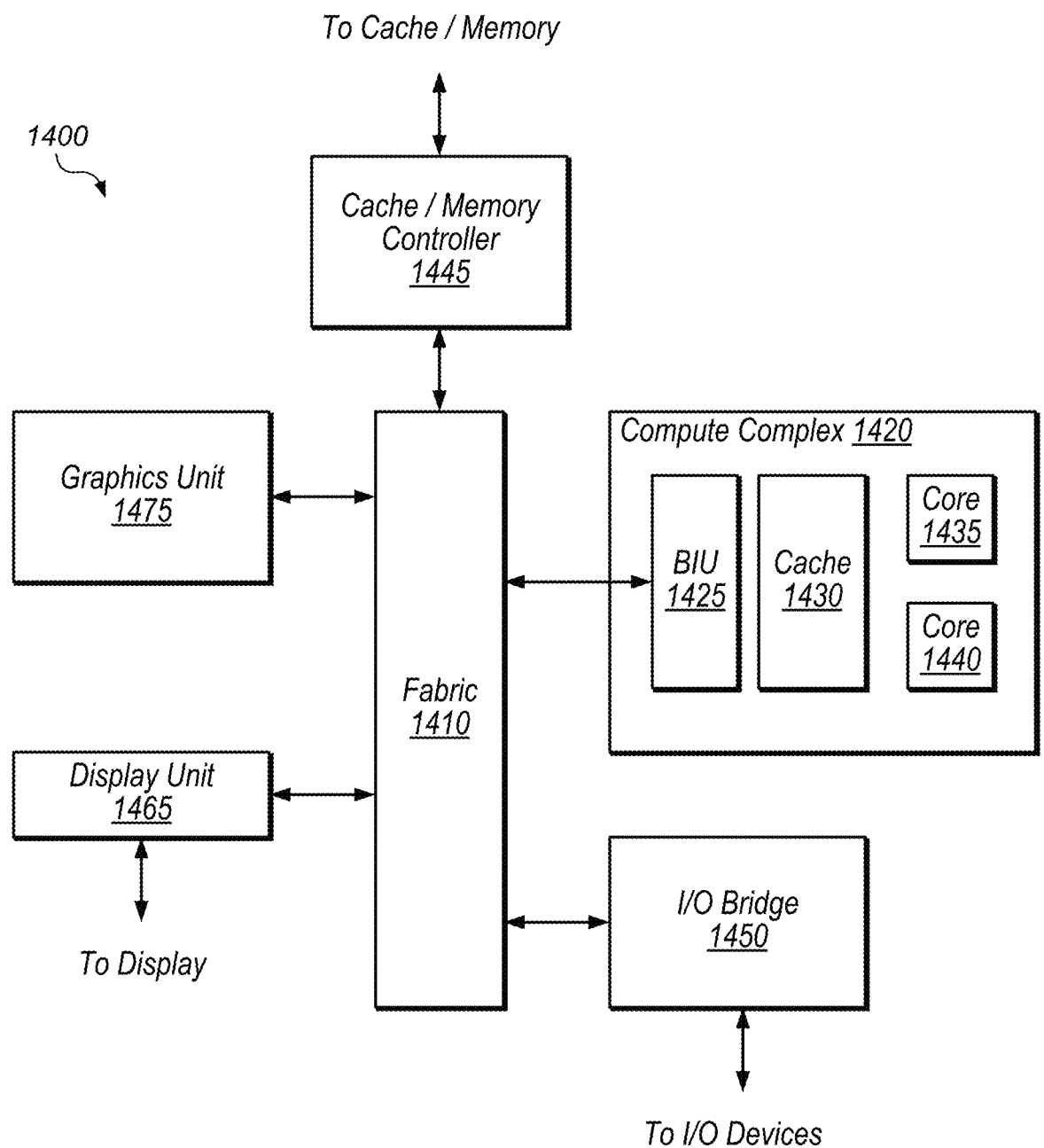
FIG. 14 is a block diagram illustrating an example computing device, according to some embodiments.

Referring now to FIG. 14, a block diagram illustrating an example embodiment of a device 1400 is shown. In some embodiments, elements of device 1400 may be included within a system on a chip. In some embodiments, device 1400 may be included in a mobile device, which may be battery-powered. Therefore, power consumption by device 1400 may be an important design consideration. In the illustrated embodiment, device 1400 includes fabric 1410, compute complex 1420 input/output (I/O) bridge 1450, cache/memory controller 1445, graphics unit 1475, and display unit 1465. In some embodiments, device 1400 may include other components (not shown) in addition to or in place of the illustrated components, such as video processor encoders and decoders, image processing or recognition elements, computer vision elements, etc.

Fabric 1410 may include various interconnects, buses, MUX's, controllers, etc., and may be configured to facilitate communication between various elements of device 1400. In some embodiments, portions of fabric 1410 may be configured to implement various different communication protocols. In other embodiments, fabric 1410 may implement a single communication protocol and elements coupled to fabric 1410 may convert from the single communication protocol to other communication protocols internally.

In the illustrated embodiment, compute complex 1420 includes bus interface unit (BIU) 1425, cache 1430, and cores 1435 and 1440. In various embodiments, compute complex 1420 may include various numbers of processors, processor cores and caches. For example, compute complex 1420 may include 1, 2, or 4 processor cores, or any other suitable number. In one embodiment, cache 1430 is a set associative L2 cache. In some embodiments, cores 1435 and 1440 may include internal instruction and data caches. In some embodiments, a coherency unit (not shown) in fabric 1410, cache 1430, or elsewhere in device 1400 may be configured to maintain coherency between various caches of device 1400. BIU 1425 may be configured to manage communication between compute complex 1420 and other elements of device 1400. Processor cores such as cores 1435 and 1440 may be configured to execute instructions of a particular instruction set architecture (ISA) which may include operating system instructions and user application instructions.

Cache/memory controller 1445 may be configured to manage transfer of data between fabric 1410 and one or more caches and memories. For example, cache/memory controller 1445 may be coupled to an L3 cache, which may in turn be coupled to a system memory. In other embodiments, cache/memory controller 1445 may be directly coupled to a memory. In some embodiments, cache/memory controller 1445 may include one or more internal caches.

As used herein, the term "coupled to" may indicate one or more connections between elements, and a coupling may include intervening elements. For example, in FIG. 14, graphics unit 1475 may be described as "coupled to" a memory through fabric 1410 and cache/memory controller 1445. In contrast, in the illustrated embodiment of FIG. 14, graphics unit 1475 is "directly coupled" to fabric 1410 because there are no intervening elements.

Graphics unit 1475 may include one or more processors, e.g., one or more graphics processing units (GPU's). Graphics unit 1475 may receive graphics-oriented instructions, such as OPENGL®, Metal, or DIRECT3D® instructions, for example. Graphics unit 1475 may execute specialized GPU instructions or perform other operations based on the received graphics-oriented instructions. Graphics unit 1475 may generally be configured to process large blocks of data in parallel and may build images in a frame buffer for output to a display, which may be included in the device or may be a separate device. Graphics unit 1475 may include transform, lighting, triangle, and rendering engines in one or more graphics processing pipelines. Graphics unit 1475 may output pixel information for display images. Graphics unit 1475, in various embodiments, may include programmable shader circuitry which may include highly parallel execution cores configured to execute graphics programs, which may include pixel tasks, vertex tasks, and compute tasks (which may or may not be graphics-related).

In some embodiments, graphics unit 1475 includes one or more shader cores and one or more ray intersect circuitry configured to handle ray intersection and motion blur according to the disclosed techniques. This may improve graphics quality, improve performance, reduce power consumption, reduce chip area, etc., relative to traditional techniques.

Display unit 1465 may be configured to read data from a frame buffer and provide a stream of pixel values for display. Display unit 1465 may be configured as a display pipeline in some embodiments. Additionally, display unit 1465 may be configured to blend multiple frames to produce an output frame. Further, display unit 1465 may include one or more interfaces (e.g., MIPI® or embedded display port (eDP)) for coupling to a user display (e.g., a touchscreen or an external display).

I/O bridge 1450 may include various elements configured to implement: universal serial bus (USB) communications, security, audio, and low-power always-on functionality, for example. I/O bridge 1450 may also include interfaces such as pulse-width modulation (PWM), general-purpose input/output (GPIO), serial peripheral interface (SPI), and inter-integrated circuit (I2C), for example. Various types of peripherals and devices may be coupled to device 1400 via I/O bridge 1450.

In some embodiments, device 1400 includes network interface circuitry (not explicitly shown), which may be connected to fabric 1410 or I/O bridge 1450. The network interface circuitry may be configured to communicate via various networks, which may be wired, wireless, or both. For example, the network interface circuitry may be configured to communicate via a wired local area network, a wireless local area network (e.g., via WiFi), or a wide area network (e.g., the Internet or a virtual private network). In some embodiments, the network interface circuitry is configured to communicate via one or more cellular networks that use one or more radio access technologies. In some embodiments, the network interface circuitry is configured to communicate using device-to-device communications (e.g., Bluetooth or WiFi Direct), etc. In various embodiments, the network interface circuitry may provide device 1400 with connectivity to various types of other devices and networks.

Example Applications

Figure 15:
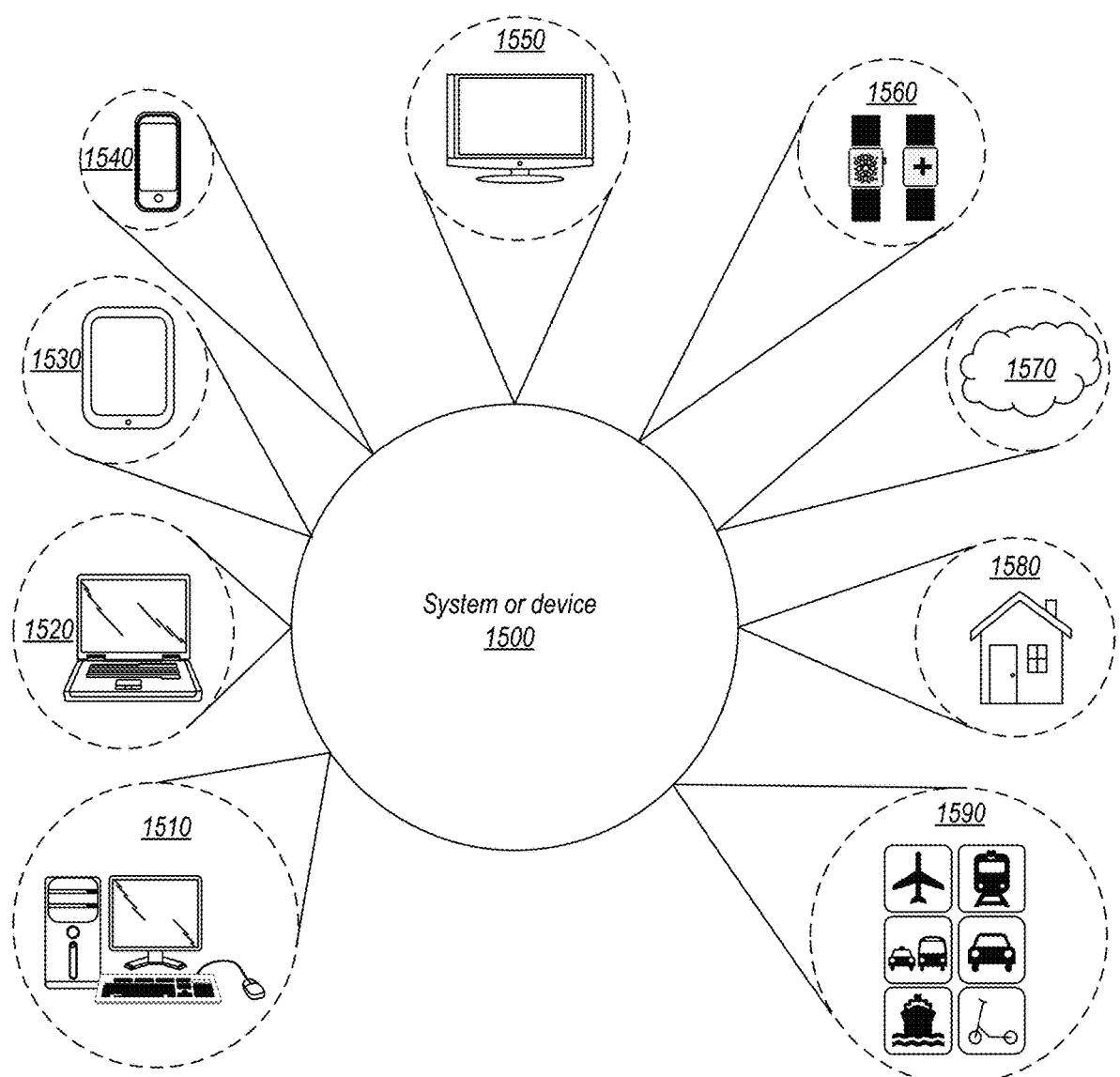
FIG. 15 is a diagram illustrating example applications of disclosed systems and devices, according to some embodiments.

Turning now to FIG. 15, various types of systems that may include any of the circuits, devices, or system discussed above. System or device 1500, which may incorporate or otherwise utilize one or more of the techniques described herein, may be utilized in a wide range of areas. For example, system or device 1500 may be utilized as part of the hardware of systems such as a desktop computer 1510, laptop computer 1520, tablet computer 1530, cellular or mobile phone 1540, or television 1550 (or set-top box coupled to a television).

Similarly, disclosed elements may be utilized in a wearable device 1560, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 1500 may also be used in various other contexts. For example, system or device 1500 may be utilized in the context of a server computer system, such as a dedicated server or on shared hardware that implements a cloud-based service 1570. Still further, system or device 1500 may be implemented in a wide range of specialized everyday devices, including devices 1580 commonly found in the home such as refrigerators, thermostats, security cameras, etc. The interconnection of such devices is often referred to as the "Internet of Things" (IoT). Elements may also be implemented in various modes of transportation. For example, system or device 1500 could be employed in the control systems, guidance systems, entertainment systems, etc. of various types of vehicles 1590.

The applications illustrated in FIG. 15 are merely exemplary and are not intended to limit the potential future applications of disclosed systems or devices. Other example applications include, without limitation: portable gaming devices, music players, data storage devices, unmanned aerial vehicles, etc.

Example Computer-Readable Medium

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that is recognized by a fabrication system configured to produce hardware (e.g., an integrated circuit) that includes the disclosed circuitry. Claims to such a storage medium are intended to cover, for example, an entity that produces a circuit design, but does not itself fabricate the design.

Figure 16:
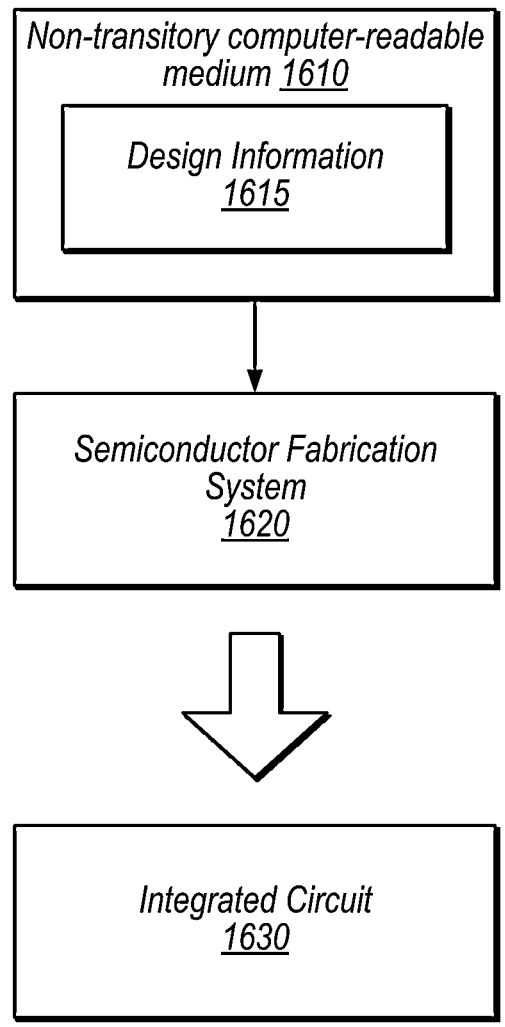
FIG. 16 is a block diagram illustrating an example computer-readable medium that stores circuit design information, according to some embodiments.

FIG. 16 is a block diagram illustrating an example non-transitory computer-readable storage medium that stores circuit design information, according to some embodiments. In the illustrated embodiment semiconductor fabrication system 1620 is configured to process the design information 1615 stored on non-transitory computer-readable medium 1610 and fabricate integrated circuit 1630 based on the design information 1615.

Non-transitory computer-readable storage medium 1610, may comprise any of various appropriate types of memory devices or storage devices. Non-transitory computer-readable storage medium 1610 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 1610 may include other types of non-transitory memory as well or combinations thereof. Non-transitory computer-readable storage medium 1610 may include two or more memory mediums which may reside in different locations, e.g., in different computer systems that are connected over a network.

Design information 1615 may be specified using any of various appropriate computer languages, including hardware description languages such as, without limitation: VHDL, Verilog, SystemC, SystemVerilog, RHDL, M, MyHDL, etc. Design information 1615 may be usable by semiconductor fabrication system 1620 to fabricate at least a portion of integrated circuit 1630. The format of design information 1615 may be recognized by at least one semiconductor fabrication system 1620. In some embodiments, design information 1615 may also include one or more cell libraries which specify the synthesis, layout, or both of integrated circuit 1630. In some embodiments, the design information is specified in whole or in part in the form of a netlist that specifies cell library elements and their connectivity. Design information 1615, taken alone, may or may not include sufficient information for fabrication of a corresponding integrated circuit. For example, design information 1615 may specify the circuit elements to be fabricated but not their physical layout. In this case, design information 1615 may need to be combined with layout information to actually fabricate the specified circuitry.

Integrated circuit 1630 may, in various embodiments, include one or more custom macrocells, such as memories, analog or mixed-signal circuits, and the like. In such cases, design information 1615 may include information related to included macrocells. Such information may include, without limitation, schematics capture database, mask design data, behavioral models, and device or transistor level netlists. As used herein, mask design data may be formatted according to graphic data system (GDSII), or any other suitable format.

Semiconductor fabrication system 1620 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1620 may also be configured to perform various testing of fabricated circuits for correct operation.

In various embodiments, integrated circuit 1630 is configured to operate according to a circuit design specified by design information 1615, which may include performing any of the functionality described herein. For example, integrated circuit 1630 may include any of various elements shown in FIGS. 1B, 3, 6, 11-12, and 14-15. Further, integrated circuit 1630 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation [entity] configured to [perform one or more tasks] is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. An apparatus, comprising:
shader circuitry configured to:
execute a shader program to generate a bounding volume hierarchy (BVH) data structure, including to:
for multiple levels of the BVH data structure, when generating multiple child elements for a node at one level, determine whether to perform a temporal split or a non-temporal split, wherein to determine whether to perform a temporal split or a non-temporal split, the shader circuitry is configured to:
determine a cost of a temporal split for the node based on: bounding region surface area, number of primitives to be enclosed, duration of time interval to be enclosed for one or more sub-trees, and an estimated overhead cost associated with evaluation of a temporal split during traversal; and
compare the determined cost with a cost of one or more other candidate splits for the node; and
insert one or more temporal branch elements for one or more determined temporal splits.

2. The apparatus of claim 1, further comprising:
ray intersect circuitry configured to:
receive coordinates for a ray; and
traverse the BVH data structure based on the coordinates.

3. The apparatus of claim 2, wherein:
the ray intersect circuitry is time oblivious and is configured to:
perform tests using bounding region test circuitry to determine whether the ray intersects with multiple spatial bounding regions of a graphics space; and
in response to reaching a temporal branch element of the BVH data structure, initiate a shader program to execute on the shader circuitry.

4. The apparatus of claim 3, wherein the shader circuitry is configured to execute the shader program to:
determine a first bounding region corresponding to a beginning of a time interval associated with the temporal branch element and a second bounding region corresponding to an end of the time interval;
interpolate between the first and second bounding regions, based on a time value for the ray, to determine an interpolated bounding region; and
determine whether to initiate further traversal based on whether the ray intersects the interpolated bounding region.

5. The apparatus of claim 4, wherein the first and second bounding regions are stored in a data structure for the temporal branch element of the BVH data structure.

6. The apparatus of claim 2, wherein the ray intersect circuitry is further configured to:
in response to reaching a leaf node of the sub-tree of the BVH data structure, initiate a shader program to determine whether the ray intersects one or more moving primitives.

7. The apparatus of claim 1, wherein the BVH data structure includes a primitive data structure representing at least beginning and end coordinates for a moving primitive, wherein multiple different sub-trees point to the primitive data structure, wherein the multiple different sub-trees represent different portions of a motion blur time interval.

8. The apparatus of claim 1, wherein the BVH data structure includes temporal branch elements at multiple levels such that a first temporal branch element at a first level defines a first sub-tree that is divided into multiple sub-trees by a second temporal branch element at a second level.

9. The apparatus of claim 1, wherein the BVH data structure has a first branching factor for one or more non-temporal splits and wherein a temporal branch element has a second branching factor that is different than the first branching factor.

10. A method, comprising:
generating, by a computing device, a bounding volume hierarchy (BVH) data structure, including:
for multiple levels of the BVH data structure, when generating multiple child elements for a node at one level, determining whether to perform a temporal split or a non-temporal split; and
inserting one or more temporal branch elements for one or more determined temporal splits, including determining whether to perform a temporal split or a non-temporal split based on:
determining a cost of a temporal split for the node, wherein the cost is based on: bounding region surface area, number of primitives to be enclosed, duration of time interval to be enclosed for one or more sub-trees, and an estimated overhead cost associated with evaluation of a temporal split during traversal; and
comparing the determined cost with a cost of one or more other candidate splits for the node.

11. The method of claim 10, further comprising:
receiving, by ray intersect circuitry of the computing device from shader circuitry of the computing device, coordinates for a ray; and
traversing, by the ray intersect circuitry, the BVH data structure based on the coordinates.

12. The method of claim 11, wherein the ray intersect circuitry is time oblivious, the method further comprising:
the ray intersect circuitry performing tests using bounding region test circuitry to determine whether the ray intersects with multiple spatial bounding regions of a graphics space; and
in response to reaching a temporal branch element of the BVH data structure, the ray intersect circuitry initiating a shader program to execute on the shader circuitry.

13. The method of claim 10, further comprising, during a traversal of the BVH data structure:
determining a first bounding region corresponding to a beginning of a time interval associated with a temporal branch element and a second bounding region corresponding to an end of the time interval;
interpolating between the first and second bounding regions, based on a time value for a given ray, to determine an interpolated bounding region; and determining whether to initiate further traversal based on whether a given ray intersects the interpolated bounding region.

14. The method of claim 13, wherein the first and second bounding regions are stored in a data structure for the temporal branch element of the BVH data structure.

15. The method of claim 10, wherein the BVH data structure includes a primitive data structure representing at least beginning and end coordinates for a moving primitive, wherein multiple different sub-trees point to the primitive data structure, wherein the multiple different sub-trees represent different portions of a motion blur time interval.

16. A non-transitory computer-readable medium having instructions stored thereon that are executable by a computing device to perform operations comprising:
  generating a bounding volume hierarchy (BVH) data structure, including:
    for multiple levels of the BVH data structure, when generating multiple child elements for a node at one level, determining whether to perform a temporal split or a non-temporal split; and
    inserting one or more temporal branch elements for one or more determined temporal splits, including determining whether to perform a temporal split or a non-temporal split based on:
      determining a cost of a temporal split for the node, wherein the cost is based on: bounding region surface area, number of primitives to be enclosed, duration of time interval to be enclosed for one or more sub-trees, and an estimated overhead cost associated with evaluation of a temporal split during traversal; and
      comparing the determined cost with a cost of one or more other candidate splits for the node.

17. The non-transitory computer-readable medium of claim 16, wherein the operations further comprise:
  receiving, by ray intersect circuitry of the computing device from shader circuitry of the computing device, coordinates for a ray, wherein the coordinates for the ray are generated by the shader circuitry in response to executing a ray intersect instruction of the instructions; and
  traversing, by the ray intersect circuitry, the BVH data structure based on the coordinates.

18. The non-transitory computer-readable medium of claim 17, wherein the operations further comprise:
  the ray intersect circuitry performing tests using bounding region test circuitry to determine whether the ray intersects with multiple spatial bounding regions of a graphics space; and
  in response to reaching a temporal branch element of the BVH data structure, the ray intersect circuitry initiating a shader program to execute on the shader circuitry.

19. The non-transitory computer-readable medium of claim 16, wherein the BVH data structure includes a primitive data structure representing at least beginning and end coordinates for a moving primitive, wherein multiple different sub-trees point to the primitive data structure, wherein the multiple different sub-trees represent different portions of a motion blur time interval.

20. The non-transitory computer-readable medium of claim 16, wherein the BVH data structure includes temporal branch elements at multiple levels such that a first temporal branch element at a first level defines a first sub-tree that is divided into multiple sub-trees by a second temporal branch element at a second level.

* * * * *